United States Patent
Li

(10) Patent No.: US 12,314,454 B2
(45) Date of Patent: May 27, 2025

(54) DATA READING METHOD, STORAGE MEDIUM, AND MOBILE TERMINAL

(71) Applicant: JRD COMMUNICATION (SHENZHEN) LTD., Guangdong (CN)

(72) Inventor: Zubai Li, Guangdong (CN)

(73) Assignee: J RD COMMUNICATION (SHENZHEN) LTD., Guangdong (CN)

( * ) Notice: Subject to any disclaimer, the term of this patent is extended or adjusted under 35 U.S.C. 154(b) by 232 days.

(21) Appl. No.: 18/007,245

(22) PCT Filed: Sep. 4, 2020

(86) PCT No.: PCT/CN2020/113463
§ 371 (c)(1),
(2) Date: Jan. 27, 2023

(87) PCT Pub. No.: WO2022/021534
PCT Pub. Date: Feb. 3, 2022

(65) Prior Publication Data
US 2023/0274036 A1    Aug. 31, 2023

(30) Foreign Application Priority Data
Jul. 31, 2020    (CN) .......................... 202010760386.1

(51) Int. Cl.
*G06F 21/00*    (2013.01)
*G06F 11/14*    (2006.01)
(Continued)

(52) U.S. Cl.
CPC .......... *G06F 21/78* (2013.01); *G06F 11/1451* (2013.01); *G06F 21/6209* (2013.01)

(58) Field of Classification Search
CPC .. G06F 21/78; G06F 11/1451; G06F 21/6209; G06F 21/6245; G06F 11/1448; G06F 16/901; G06F 21/602
See application file for complete search history.

(56) References Cited

U.S. PATENT DOCUMENTS 8,468,591 B2 * 6/2013 Silverstone ............. H04L 63/08
10,192,056 B1 * 1/2019 Goel ..................... G06F 21/575
(Continued)

FOREIGN PATENT DOCUMENTS

CN    1877539 A    12/2006
CN    101127784 A    2/2008
(Continued)

OTHER PUBLICATIONS

International Search Report in International application No. PCT/CN2020/113463, mailed on Apr. 26, 2021.
(Continued)

*Primary Examiner* — Kendall Dolly
(74) *Attorney, Agent, or Firm* — PV IP PC; Wei Te Chung

(57) ABSTRACT

Disclosed are a data reading method, a storage medium, and a mobile terminal. The method is applied to the mobile terminal. The method comprises: acquiring private data from a preset application program; backing up the private data to a device encryption storage area of the mobile terminal that is in a boot mode; and when the preset application program is run, if the mobile terminal is in the boot mode, reading the private data from the device encryption storage area.

15 Claims, 5 Drawing Sheets

(51) Int. Cl.
*G06F 21/62* (2013.01)
*G06F 21/78* (2013.01)

(56) References Cited

U.S. PATENT DOCUMENTS

| | | | | |
|---|---|---|---|---|
| 2014/0372743 A1* | 12/2014 | Rogers | ............... | H04L 9/3234 713/155 |
| 2015/0200934 A1* | 7/2015 | Naguib | ............... | H04L 9/3247 713/168 |
| 2017/0177507 A1* | 6/2017 | Ren | ............... | G06F 3/062 |
| 2024/0362370 A1* | 10/2024 | Jain | ............... | G06F 21/72 |

FOREIGN PATENT DOCUMENTS

| | | |
|---|---|---|
| CN | 106528470 A | 3/2017 |
| CN | 106921799 A | 7/2017 |
| CN | 107632870 A | 1/2018 |
| CN | 108388451 A | 8/2018 |
| WO | 2016142453 A1 | 9/2016 |

OTHER PUBLICATIONS

Written Opinion of the International Search Authority in International application No. PCT/CN2020/113463,mailed pn Apr. 26, 2021.
Chinese Office Action issued in corresponding Chinese Patent Application No. 202010760386.1 dated Nov. 16, 2022, pp. 1-14.
http://events.jianshu.io/p/495934e41b96, Publication date: Jul. 29, 2020, p. 1-7, claims1-10.
Second Chinese Office Action issued in corresponding Chinese Patent Application No. 202010760386.1 dated Jun. 29, 2023, pp. 1-6.
Notification to Grant Patent Right for Invention issued in corresponding Chinese Patent Application No. 202010760386.1 dated Oct. 31, 2023, pp. 1-4.

* cited by examiner

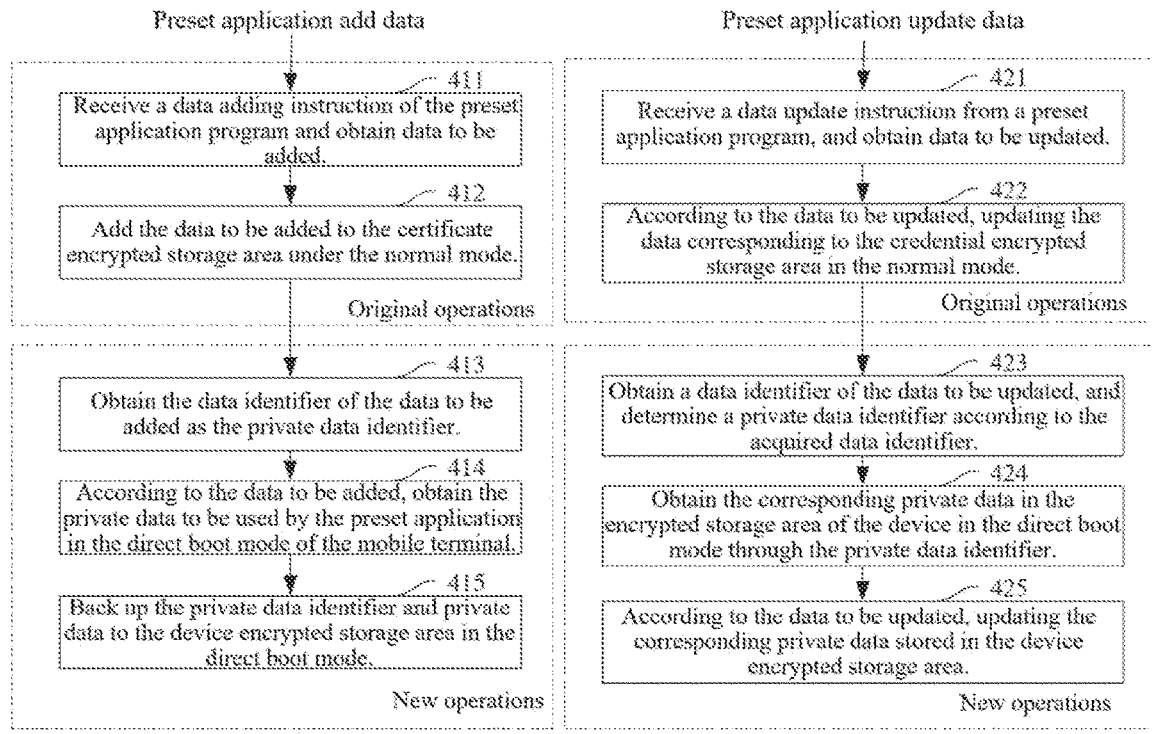
Fig. 4a                    Fig. 4b
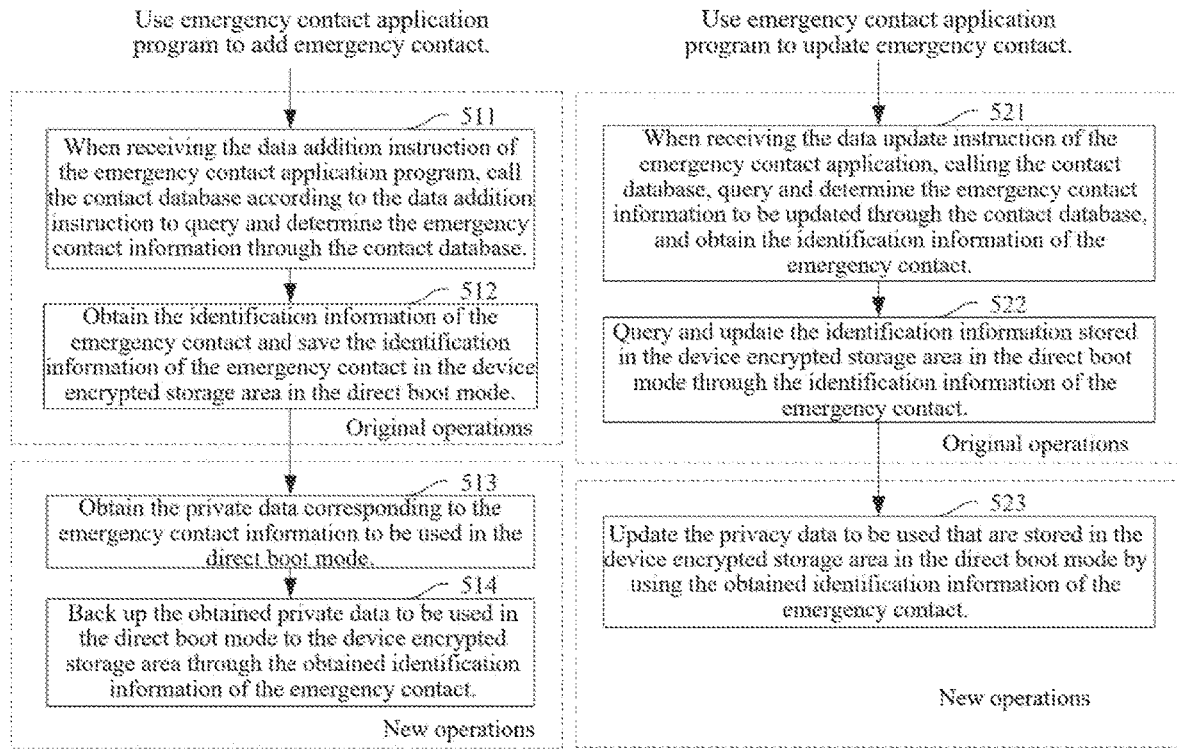
Fig. 5a                    Fig. 5b

DATA READING METHOD, STORAGE MEDIUM, AND MOBILE TERMINAL

CROSS REFERENCE TO RELATED APPLICATIONS

This application is a US national phase application based upon an International Application No. PCT/CN2020/113463, filed on Sep. 4, 2020, which claims priority of Chinese Patent Application No. 202010760386.1, entitled "DATA READING METHOD, STORAGE MEDIUM AND MOBILE TERMINAL" filed on Jul. 31, 2020, the disclosure of which is incorporated herein by reference in its entirety.

FIELD OF THE DISCLOSURE

The present disclosure relates to a communication field, and more particularly, to a data reading method, a storage medium and a mobile terminal.

BACKGROUND

The Direct Boot Mode is a new feature introduced in Android N, which refers to a new mode that the terminal device enters after the terminal device is started until it is unlocked by the user. In this new mode, the terminal device is only allowed to run some basic applications, such as alarm clock, SMS, phone call and other applications. Most of the other applications are not allowed to run. This is for protecting user privacy. In order to protect user privacy, some basic applications will not be able to obtain the to be used data, such as correlating private data, etc. in the direct boot mode, and thus these applications cannot be used or have some errors. For example, an emergency contact application, as an emergency function, is allowed to run in an unlocked state, such as the direct boot mode. However, the database of contacts, which contains a large amount of personal private data, is not allowed to be accessed in the unlocked state. This results in a failure of the emergency call function corresponding to the emergency contact application in the direct moot mode.

SUMMARY

Technical Problem

One objective of an embodiment of the present disclosure is to provide a data reading method, a storage medium and a mobile terminal to solve the above issues when some applications cannot be used or have some errors in the direct boot mode.

Technical Solution

According to an embodiment of the present disclosure, a data reading method, applied to a mobile terminal, is disclosed. The data reading method comprises: obtaining privacy data of a preset application; backing up the private data to a device encrypted storage area under a direct boot mode of the mobile terminal; and when the preset application is being performed, if the mobile terminal is in the direct boot mode, reading the private data from the device encrypted storage area.

Optionally, the data reading method further comprises: when the mobile terminal is in a normal mode, reading the private data from a credential encrypted storage area under the normal mode.

Optionally, the data reading method further comprises:
when the mobile terminal is in the direct boot mode, monitoring a broadcast message of mode switching, and switching the mobile terminal from the direct boot mode to the normal mode; and
when the broadcast message of mode switching is monitored, reading the private data from the credential encrypted storage area under the normal mode.

Optionally, the step of obtaining privacy data of the preset application comprises:
obtaining the privacy data to be used by the preset application under the direct boot mode of the mobile terminal.

Optionally, the step of obtaining the privacy data to be used by the preset application under the direct boot mode of the mobile terminal comprises:
from the credential encrypted storage area under the normal mode of the mobile terminal, obtaining the privacy data to be used by the preset application program under the direct boot mode of the mobile terminal, or
when a data addition instruction of the preset application program is received, according to the data addition instruction, obtaining the private data to be added by the preset application under the direct boot mode of the mobile terminal.

Optionally, the step of obtaining privacy data of the preset application comprises: obtaining the private data and a private data identifier corresponding to the private data; and the step of backing up the private data to the device encrypted storage area under the direct boot mode of the mobile terminal comprises: backing up the private data and the private data identifier to the device encrypted storage area under the direct boot mode of the mobile terminal.

Optionally, the data reading method further comprises following steps after the step of backing up the private data and the private data identifier to the device encrypted storage area under the direct boot mode of the mobile terminal:
when a data operation instruction of the credential encrypted storage area under the normal mode of the mobile terminal is received, determine an operation type, data to be operated, and a data identifier corresponding to the data to be operated according to the data operation instruction;
detecting whether the data identifier includes a private data identifier;
when the private data identifier is included, according to the private data identifier, obtaining the corresponding private data in the encrypted storage area of the device;
performing an operation on the private data according to the operation type and the data to be operated.

Optionally, the data operation instruction is a data adding instruction and the operation type is addition, the data to be operated includes data to be added, and the corresponding data identifier includes a data identifier of the data to be added;
the step of detecting whether the data identifier includes the private data identifier comprises: obtaining the data identifier of the data to be added, determining that the data identifier includes a private data identifier according to the data identifier, and using the data identifier as a private data identifier;
the step of obtaining the corresponding private data in the device encrypted storage area according to the private data identifier comprises: obtaining the privacy data to be used by the preset application in the direct boot mode of the mobile terminal according to the privacy data identifier, and using the privacy data to be used in direct boot direct boot mode as the corresponding privacy data in the device encrypted storage area; and the step of performing the operation on the private data according to the operation type and the data to be operated comprises: backing up the private data identifier and the private data to the device encrypted storage area in the direct boot mode.

Optionally, the data operation instruction is a data updating instruction and the operation type is update, the data to be operated includes data to be updated, and the corresponding data identifier includes a data identifier of the data to be updated;

the step of detecting whether the data identifier includes the private data identifier comprises: obtaining the data identifier of the data to be updated, determining a private data identifier according to the data identifier; and the step of performing the operation on the private data according to the operation type and the data to be operated comprises: updating the corresponding private data in the device encrypted storage area in the direct boot mode according to the data to be updated.

Optionally, the data operation instruction is a data deletion instruction and the operation type is deletion, the data to be operated includes data to be deleted, and the corresponding data identifier includes a data identifier of the data to be deleted;

the step of detecting whether the data identifier includes the private data identifier comprises: obtaining the data identifier of the data to be deleted, determining a private data identifier according to the data identifier; and the step of performing the operation on the private data according to the operation type and the data to be operated comprises: deleting the corresponding private data in the device encrypted storage area in the direct boot mode according to the data to be deleted.

According to an embodiment of the present disclosure, a storage medium, storing a plurality of instructions, is disclosed. The instructions stored in the storage medium are configured to be executed by a processor to perform the above-mentioned data reading method.

According to an embodiment of the present disclosure, a mobile terminal is disclosed. The mobile terminal comprises: a storage device, configured to store a plurality of instructions and data; and a processor, electrically connected to the storage device, configured to execute the plurality of instructions and load the data to perform the above-mentioned data reading method.

Advantageous Effects

The data reading method, the storage media and the mobile terminal according to an embodiment of the present disclosure can obtain the private data of a preset application; back up the private data to the device encrypted storage area under the direct boot mode of the mobile terminal; and when running the preset application, if the mobile terminal is in the direct boot mode, read the private data from the device encrypted storage area. It could be understood that the privacy data of the preset application is extracted and backed up to the storage space of the device encrypted storage area in the direct boot mode, so that the privacy data can be read in the direct boot mode. In this way, the preset application can still be run in the direct boot mode so it solves the problems that some application cannot be used in the direct boot mode or have errors and improves the user experience.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 4a is a flow chart of a preset application adding private data according to an embodiment of the present disclosure.

FIG. 4b is a flow chart of a preset application updating private data according to an embodiment of the present disclosure.

FIG. 5a is a flow chart of an emergency contact application adding emergency contacts according to an embodiment of the present disclosure.

FIG. 5b is a flow chart of an emergency contact application updating emergency contacts according to an embodiment of the present disclosure.

DETAILED DESCRIPTION OF PREFERRED EMBODIMENTS

Figure 1A:
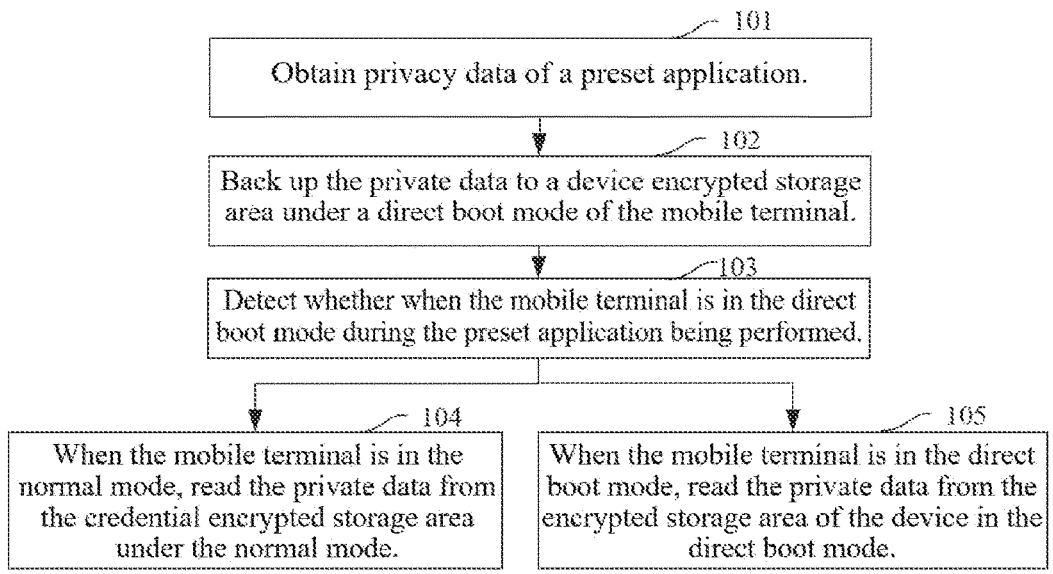
FIG. 1a is a flow chart of a data reading method according to an embodiment of the present disclosure.

The disclosure is described below in detail with reference to the accompanying drawings, wherein like reference numerals are used to identify like elements illustrated in one or more of the figures thereof, and in which exemplary embodiments of the disclosure are shown. This disclosure may, however, be embodied in many different forms and should not be construed as limited to the particular embodiments set forth herein. Rather, these embodiments are provided so that this disclosure will be thorough and complete, and will fully convey the scope of the disclosure to those skilled in the art.

The present disclosure provides a data reading method, a data reading device, and a storage medium and a mobile terminal. Any data reading device disclosed in the present disclosure can be integrated into the mobile terminal. The mobile terminal can include a smart phone, a pad, a wearable device, a robot and/or any other terminal equipment. The mobile terminal includes a preset application, which can be executed in a direct boot mode of the mobile terminal. Preferably, the mobile terminal is a mobile terminal installed with an Android system.

In the following disclosure, the data reading method, the data reading device, the storage medium and the mobile terminal will be illustrated below:

Please refer to FIG. 1. FIG. 1a is a flow chart of a data reading method according to an embodiment of the present disclosure. The data reading method is applied to the mobile terminal. The data reading method includes steps 101~105 below:

Step 101: Obtaining privacy data of a preset application.

Here, the preset application refers to an application that can be executed in the direct boot mode of the mobile terminal. For example, it can be one of some basic applications in the mobile terminal, including applications such as alarm clock, emergency contacts, text messages, and calls. The private data includes stored contact information, friend information, communication information with friends, etc., and personal data of user of the mobile terminal.

In one case, the preset application program can be, as an example, an emergency contact application. The emergency contact application adds a certain or a plurality of contacts in the contact database (the database used for storing contact information in the mobile terminal, commonly known as the phone book) as emergency contacts. The emergency contact application needs to provide correlating access when the screen is locked, so that a user can quickly call emergency contacts. In this way, the privacy data includes the emergency contact information that can be contacted in an emergency situation, and the emergency contact information is consistent with the corresponding contact information in the contact database, which specifically includes one or more of the contact name, contact phone number, contact email, contact department, and contact image.

In another case, the preset application program can be, as an example, a phone call application as an example. The privacy data corresponding to the phone application includes contact information in the contact database. The contact information specifically includes one or more of the contact name, contact phone number, contact email, contact department, and contact image. The private data corresponding to the phone call application also includes some other information, such as communication/call records.

The private data of the preset application can be obtained in various ways. Before describing how to obtain the private data of the preset application, the direct boot mode and normal mode of the mobile terminal and the storage data area of the mobile terminal will be illustrated first.

Boot mode, also called direct boot mode, refers to a new mode that the mobile terminal enters after booting until the mobile terminal user unlocks the mobile terminal.

Normal mode, also called non-direct boot mode, refers to the mode corresponding to the stage after the mobile terminal user unlocks the mobile terminal.

Figure 1B:
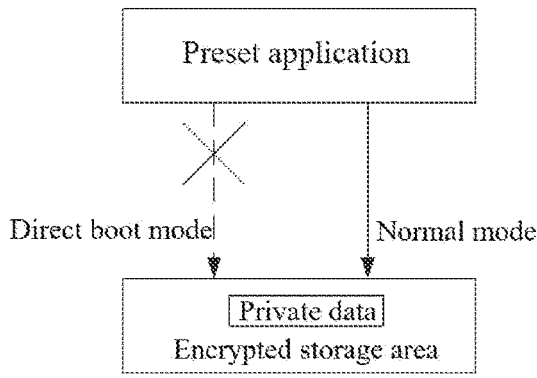
FIG. 1b shows a preset application reading private data according to a first embodiment of the present disclosure.

In order to support the direct boot mode, the mobile terminal provides two storage data areas in advance:

(1) Credential encrypted storage area, which can also be abbreviated as CE storage area, is a storage area of the mobile terminal defaults to store data. The credential encrypted storage area can also be understood as a default storage location. Only after the mobile terminal user unlocks the mobile terminal, this storage area could be used to store data. That is, the storage space can be used in normal mode. As shown in FIG. 1b, the preset application can normally read and write the data stored in the credential encrypted storage area (default storage location) in normal mode.

(2) Device encrypted storage area, which can also be abbreviated as DE storage area, mainly corresponds to the storage area used in the direct boot mode. Please note, this storage space can be used in both the direct boot mode and the normal mode.

In general, the preset application needs to store the data to be used to be used in the direct boot mode in the device encrypted storage area. But for the private data, such as contact information in the contact database, call records, communication friend information, communication information with communication friends, etc. In order to protect the user privacy, it is not proper to expose too much information without unlocking the mobile terminal. Therefore, the private data of the preset application is placed in the storage area of the default storage data, which is the credential encrypted storage area. In the direct boot mode, the data in the credential encrypted storage area cannot be read. As shown in FIG. 1b, the preset application cannot normally access the data stored in the credential encrypted storage area (the default storage location) in the direct boot mode.

Therefore, Step 101 includes: obtaining the privacy data of the preset application program from the credential-encrypted storage area under the normal mode of the mobile terminal; or if the data addition instruction of the preset application program is received, the private data to be added by the preset application program is obtained according to the data addition instruction.

The step of obtaining the private data from the credential encrypted storage area under the normal mode of the mobile terminal could include, for example, if the preset application is an emergency contact application, obtaining the private data of the emergency contact application, which is the corresponding emergency contact information, from the credential encrypted storage area in the normal mode of the mobile terminal. Or, if the preset application is a phone call application, the privacy data of the phone call application, which include all corresponding contact information, are obtained from the credential encrypted storage area under the normal mode of the mobile terminal.

Here, if the data addition instruction of the preset application program is received, the data addition instruction carries the privacy data to be added by the preset application program, and the privacy data to be added by the preset application is obtained according to the data addition instruction. For example, if the preset application is a phone calll application, the data adding instruction of the phone application program carries the privacy data to be added, such as contact information to be added or call record information to be added, and the data adding instruction is used to transfer the carried contact information to the contact database or store the call record information to be added. In this way, if the data addition instruction of the phone call application is received, the contact information to be added or the call record information to be added by the phone call application are obtained according to the data addition instruction. Here, the data adding instruction of the contact information to be added can be triggered by the save control on the adding interface corresponding to the contact database. That is, the save control on the adding interface corresponding to the contact database is triggered to trigger the data adding instruction. The data addition instruction for the call record information to be added can be generated when an outgoing call or an incoming call is detected.

In some cases, Step 101 includes: Obtaining the private data of the preset application and the private data identifier corresponding to the private data from the credential encrypted storage area under the normal mode of the mobile terminal.

Or, Step 101 includes: When the data addition instruction of the preset application program is received, according to the data addition instruction, obtaining the privacy data newly added by the preset application program and the privacy data identifier corresponding to the privacy data.

It can be understood that the private data includes a corresponding private data identifier. The private data identifier can uniquely identify the private data. If the private data is contact information, the private data identifier corresponds to the identification information of each contact. Specifically, the contact's external Uniform Resource Identifier (URI) can be used as the privacy data identifier, or the identifier (storage number, etc.) corresponding to the contact information in the contact database can be used as the privacy data identifier, or the contact phone numbers could be used as the private data identifiers, etc.

Through obtaining the private data identifier, the user could quickly and conveniently find the private data corresponding to the private data identifier through the private data identifier, and thus user experience is improved.

It should be noted that the emergency contact application and the phone call application mentioned in the present disclosure are only examples of preset applications, in order to facilitate the understanding of the present disclosure. These are not limitations of the preset applications.

Step 102: Backing up the private data to the device encrypted storage area under the direct boot mode of the mobile terminal.

After obtaining the private data of the preset application program, the private data is backed up to the device encrypted storage area under the direct boot mode of the mobile terminal. Understandably, since the data in the device encrypted storage area under the direct boot mode of the mobile terminal can be used in both the direct boot mode and the normal mode, in one case, the obtained private data of the preset application are only stored in the device encrypted storage under the direct boot mode. This could reduce the occupied storage space of the mobile terminal. Correspondingly, when the private data needs to be obtained, they are obtained from the device encrypted storage area.

Figure 1C:
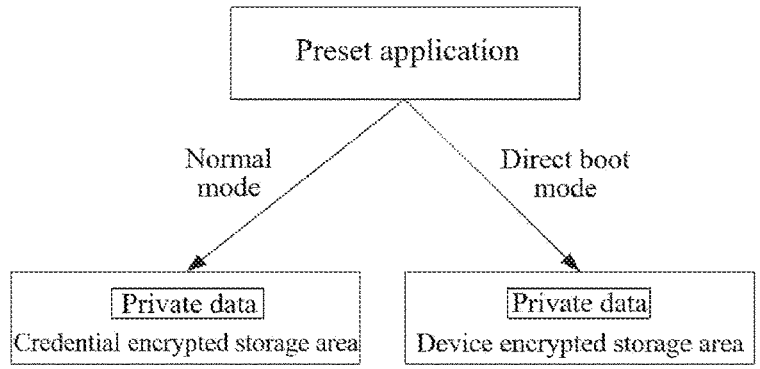
FIG. 1c shows a preset application reading private data according to a second embodiment of the present disclosure.

Preferably, the private data of the preset application is stored in both the device encrypted storage area under the direct boot mode and the credential encrypted storage area under the normal mode, so that other applications can use private data stored in the credential encrypted storage area under the normal mode. In this way, the practicality could be improved. Understandably, on the basis that the private data are stored in the credential encrypted storage area under the normal mode, the corresponding private data could be obtained and backed up to the device encrypted storage area, in the form of a single application and double data storage to solve the problem in the direct boot mode. The negative impact caused by the inability to obtain the private data in the credential encrypted storage area in the normal mode can be alleviated to improve the user experience. Specifically, as shown in FIG. 1c, the private data of the preset application is stored in the credential encrypted storage area under the normal mode and in the device encrypted storage area in the direct boot mode. In the normal mode, the private data stored in the credential encrypted storage area (the default storage location) are preferably used. In the direct boot mode, the private data stored in the device encrypted storage area are preferably used. In this way, the private data are used in the form of single application double data storage.

Here, the private data can be backed up in the device encrypted storage area in the direct boot mode of the mobile terminal in the form of key-value pairs. If the amount of private data is relatively small, SharedPreference can be used for storage. Correspondingly, the private data will be automatically stored in the device encrypted storage area. Here, SharedPreference, referred to as SP, is a storage method provided by the Android system for storing some simple configuration information. Specifically, the Map data structure is used to store data in the form of key-value pairs. That is, the data are stored in the XML format in the mobile terminal, and the corresponding doucments are stored in/data/data/<package name>/shared_prefs directory. This is suitable for a single-process and a small-batch data storage and access.

In some cases, if the private data identifier is obtained in Step 101, correspondingly, Step 102 includes: backing up the private data and the corresponding private data identifier to the device encrypted storage area under the direct boot mode of the mobile terminal.

Step 103: Detecting whether when the mobile terminal is in the direct boot mode during the preset application being performed.

When the mobile terminal runs the preset application, it detects whether the mobile terminal is in the direct boot mode. Here, whether the mobile terminal is in the direct boot can be detected through a preset function, and the preset function is UserManager.isUserUnlocked ( ).

Step 104: when the mobile terminal is in the normal mode, reading the private data from the credential encrypted storage area under the normal mode. That is, if it is detected that the mobile terminal is in the normal mode, the private data is read from the storage area of the default storage location, which is the credential encrypted storage area.

Step 105: When the mobile terminal is in the direct boot mode, reading the private data from the encrypted storage area of the device in the direct boot mode. That is, if it is detected that the mobile terminal is currently in the direct boot mode, it can be understood that the mobile terminal is in the stage of being started and not unlocked. Correspondingly, the private data is read from the device encrypted storage area.

It should be noted that Steps 103-105 can be understood as steps related to querying the private data.

The aforementioned embodiment extracts the private data of the preset application and backs it up in the device encrypted storage area under the direct boot mode, so that the private data can be read from the device encrypted storage area under the direct boot mode. In this way, the preset application can be normally run in the direct boot mode. This solves the problems that the application cannot be used or have errors in the direct boot mode and improves the user experience.

Figure 2:
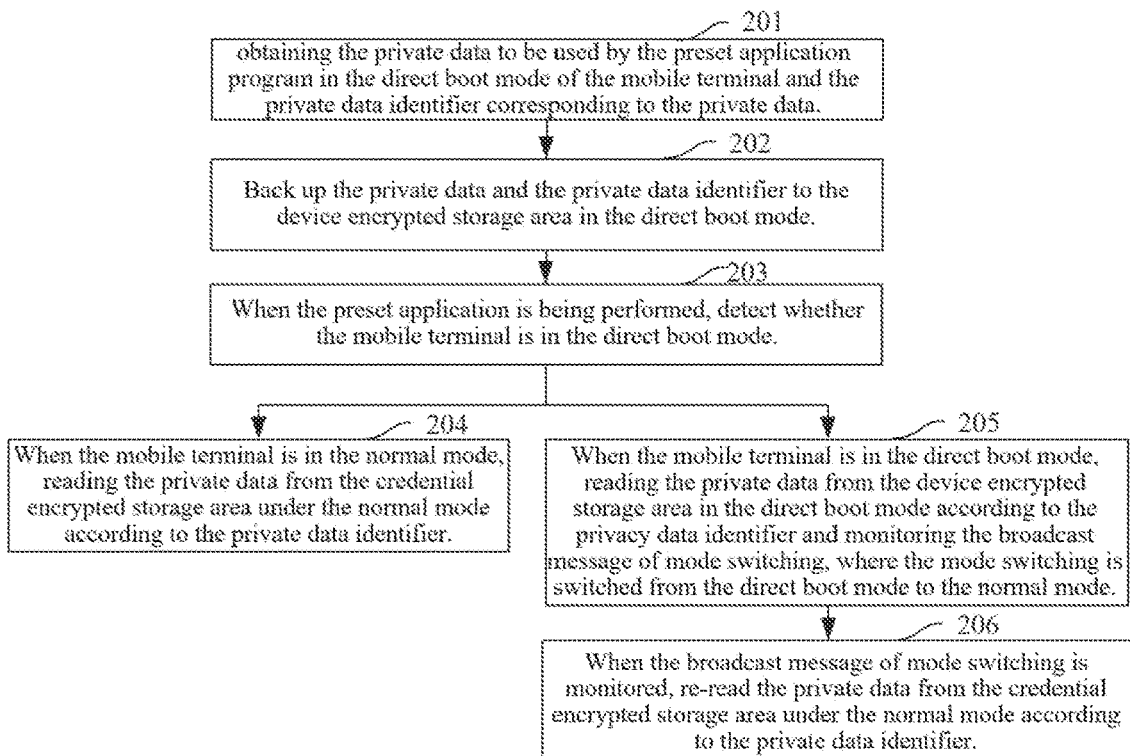
FIG. 2 is a flow chart of a data reading method according to another embodiment of the present disclosure.

Please refer to FIG. 2. FIG. 2 is a flow chart of a data reading method according to another embodiment of the present disclosure. The data reading method is used in a mobile terminal. The data reading method comprises Steps 201-206 below:

Step 201: Obtaining the private data to be used by the preset application program in the direct boot mode of the mobile terminal and the private data identifier corresponding to the private data.

Taking an emergency contact application as the preset application as an example. The private data that the emergency contact application needs to use in the direct boot mode of the mobile terminal includes the contact phone number. Understandably, with the contact phone number, you can use emergency contact application to call the phone number to quickly reach emergency contacts so that an emergency call function is implemented. The privacy data that the emergency contact application needs to use in the direct boot mode of the mobile terminal can also include the contact name. in this way, when calling the emergency contact, the contact name is displayed at the same time, and the user experience is improved. Correspondingly, the private data identifier of the emergency contact application refers to the identification information of each emergency contact. Understandably, the emergency contact information includes multiple different information, which may not all need to be used in the direct boot mode. Therefore, only the private data that the emergency contact application needs to use in the direct boot mode are obtained.

Taking a phone call application as the preset application as an example. The privacy data that the phone call application needs to use in the direct boot mode of the mobile terminal includes the phone numbers of the contacts. Understandably, with the phone number of the contact, the phone call communication with the contacts could be implemented to achieve a voice communication function. The privacy data to be used by the phone call application in the direct boot mode of the mobile terminal can also include the name of the contact, so that the name of the contact is displayed at the same time during the phone call communication with the contact, and the name of the contact and the corresponding phone number are displayed in the call log. This could improve the user experience. Correspondingly, the private data identifier of the phone call application refers to the identifier information of each contact. Similarly, it is understandable that only the private data that the phone application needs to use in the direct boot mode should be obtained.

It can be understood that, if the privacy data of the preset application in Step 101 are compared with the privacy data to be used by the preset application in Step 201 in the direct boot mode of the mobile terminal, the set corresponding to the privacy data to be used by the preset application in Step 201 in the direct boot mode of the mobile terminal is less than or equal to set corresponding to the privacy data to be used of the preset application.

Specifically, Step 201 includes: obtaining the private data to be used by the preset application program in the direct boot mode of the mobile terminal from the credential encrypted storage area under the normal mode of the mobile terminal; or if the data addition instruction of the preset application is received, according to the data addition instruction, obtaining the private data to be added by the preset application and to be used in the direct boot mode of the mobile terminal.

Step 202: Backing up the private data and the private data identifier to the device encrypted storage area in the direct boot mode.

Correspondingly, the private data to be used by the preset application in the direct boot mode are obtained from the credential encrypted storage area under the normal mode of the mobile terminal and are backed up into the device encrypted storage area under the direct boot mode. Or, the private data to be added in the direct boot mode of the mobile terminal by the preset application are backed up into the device encrypted storage area under the direct boot mode. In this case, the privacy data to be added needs to be saved into the default storage location, which is the credential encrypted storage area.

The set of privacy data to be used by the preset application in the direct boot mode obtained in Step 201 is less than or equal to the set of privacy data of the preset application in Step 101. Therefore, after the private data to be used in the direct boot mode are backed up into the device encrypted storage area, the private data that the preset application needs to use in the direct boot mode can be obtained when the preset application is running. This ensures the normal operation of the preset application. Furthermore, it can maximize the confidentiality of user data and minimize the exposure of private data. Moreover, the storage space for storing the private data of the mobile terminal is reduced and thus unnecessary consumption of storage space is reduced. In addition, the private data identifier is also backed up, so that the corresponding private data can be more quickly found according to the private data identifier, and the private data corresponding to the private data identifier in the credential encrypted storage area and the device encrypted storage area can be conveniently synchronized, such as synchronously updated, etc.

Step 203: When the preset application is being performed, detecting whether the mobile terminal is in the direct boot mode.

Step 204: When the mobile terminal is in the normal mode, reading the private data from the credential encrypted storage area under the normal mode according to the private data identifier.

According to the private data identifier, the corresponding private data can be quickly read from the credential encrypted storage area.

Step 205: When the mobile terminal is in the direct boot mode, reading the private data from the device encrypted storage area in the direct boot mode according to the privacy data identifier and monitoring the broadcast message of mode switching, where the mode switching is switched from the direct boot mode to the normal mode.

According to the private data identifier, the corresponding private data can be quickly read from the device encrypted storage area.

It should be noted that if the mobile terminal is in the direct boot mode, it means that the mobile terminal is in the stage after booting and before unlocking. However, user's unlocking operation is an irregular behavior. When it is detected that the user is unlocking successfully, the mobile terminal will enter the normal mode. In this way, in some cases, it will involve reading the private data when the mode is switched. Since the direct boot mode is the mode corresponding to the stage when the mobile terminal is started and before it is unlocked, there is only one case of mode switching. That is, when the mobile terminal is successfully unlocked, the most is switched from the direct boot mode to the normal mode of the mobile terminal.

Assume that the mobile terminal user opens the preset application in the direct boot mode, and the preset application reads the private data from the device encrypted storage area. After the mobile terminal user successfully unlocks the mobile terminal, it has entered the normal mode. If no mode switching is detected, the mobile terminal still reads the private data under the direct boot mode, which may lead to a bad user experience. So in the process of mode switching, the following disclosure will explain how to deal with it.

The broadcast message of mode switching is monitored. The broadcast message is specifically "android.intent.action.USER_UNLOCKED". This broadcast message can be used to monitor the mode switch of the mobile terminal user from the direct boot mode of the mobile terminal to the normal mode.

Step 206: When the broadcast message of mode switching is monitored, re-read the private data from the credential encrypted storage area under the normal mode according to the private data identifier.

If the broadcast message of mode switching is monitored, the private data are read from the credential encrypted storage area again according to the private data identifier in order to complete the switching of private data reading. This could improve the user experience. If the broadcast message of mode switching is not monitored, then the mobile terminal continues to monitor.

For steps not described in the embodiment, please refer to the corresponding description above, and details are omitted here. The privacy data obtained in this embodiment are the privacy data to be used by the preset application in the direct boot mode. Moreover, this embodiment also defines the processing of special cases. That is, this embodiment also defines the process of reading private data when two modes are involved in mode switching.

Figure 3:
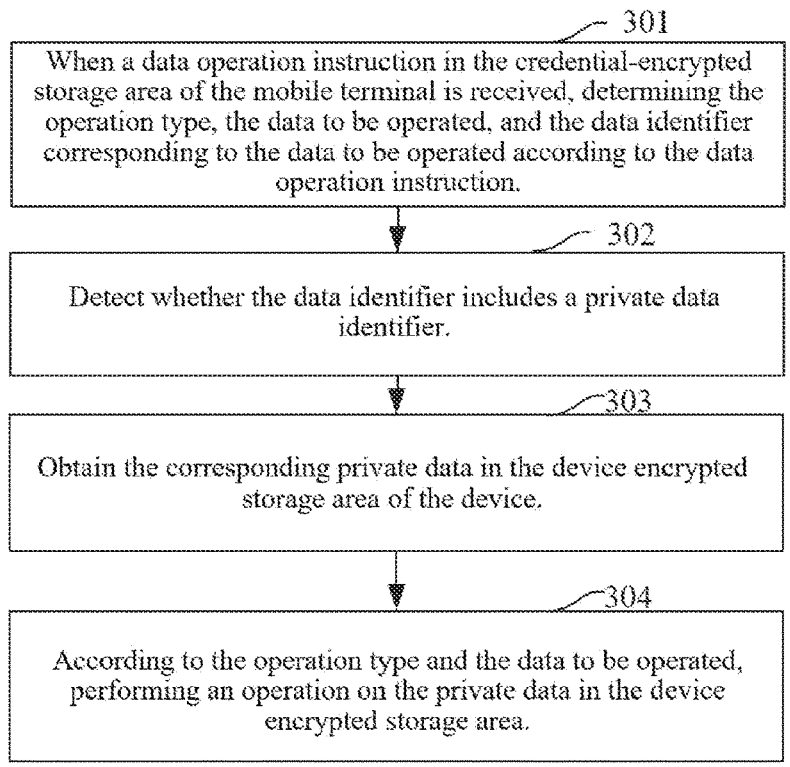
FIG. 3 is a flow chart of a data reading method according to another embodiment of the present disclosure.

In some cases, it also involves modifying the private data in the credential encrypted storage area in the normal mode. At this time, it involves the synchronization of the private data in the credential encrypted storage area in the normal mode with the private data in the device encrypted storage area in the direct boot mode. Specifically, please refer to FIG. 3. FIG. 3 is a flow chart of a data reading method according to another embodiment of the present disclosure. The data reading method includes the following steps:

Step 301: When a data operation instruction in the credential-encrypted storage area of the mobile terminal is received, determining the operation type, the data to be operated, and the data identifier corresponding to the data to be operated according to the data operation instruction.

It can be understood that the data operation instruction carries information such as the operation type, the data to be operated, and the data identifier corresponding to the data to be operated, and the operation type, the data to be operated, and the data identifier corresponding to the data to be operated are determined according to the data operation instruction. Here, the data operation instruction includes a data update instruction and a data deletion instruction, and further includes a private data update instruction and a private data deletion instruction, etc., and corresponding operation types include a private data update and a private data deletion, etc. Data to be operated, correspondingly, includes data to be updated and data to be deleted. For example, for emergency contact applications and phone call applications, the data to be operated involves contact information. That is, the data to be operated includes contact information. Operations on the contact information represent operations on the contact information in the contact database. Correspondingly, the data identifier corresponding to the data to be operated is the identification information of the contact to be operated. For certainly phone call applications, the corresponding data to be operated also includes call records and so on.

Understandably, because the private data may be backed up from the credential encrypted storage area under the normal mode into the device-encrypted storage area under the direct boot mode, and the set of the private data in the credential encrypted storage area is greater than or equal to the set of the privacy data in the device-encrypted storage area, in general, when an operation is performed on the private data in the credential encrypted storage area, a synchronization is required.

Step 302: Detecting whether the data identifier includes a private data identifier.

Since the data to be operated may not involve the private data stored in the device encrypted storage area, it is necessary to detect whether the data identifier to be operated includes the private data identifier. For example, for the emergency contact application, when the contact information in the contact database in the credential encrypted storage area needs to be operated, the data to be operated may not be the emergency contact involved in the emergency contact application.

If the data identifier does not include the private data identifier, then the mobile terminal directly follows the prior art to perform the operations matching the operation type on the data to be operated in the credential encrypted storage area. If the private data identifier is included, then the process goes to Step 303. In addition, according to prior art, the data to be operated in the credential encrypted storage area needs to be matched with the operation type.

Step 303: Obtaining the corresponding private data in the device encrypted storage area of the device.

Since the private data identifier has a corresponding relationship with the private data, the corresponding private data in the encrypted storage area of the device can be obtained through the private data identifier.

Step 304: According to the operation type and the data to be operated, performing an operation on the private data in the device encrypted storage area.

If the operation type is update, then the mobile terminal updates the private data in the device encrypted storage area according to the data to be updated. If the operation type is deletion, the mobile terminal deletes the private data in the device encrypted storage area according to the data to be deleted.

In this embodiment, the mobile terminal could perform an update operation or a deletion operation on the private data in the device-encrypted storage area when there is a need to update or delete the private data in the credential-encrypted storage area to synchronize the private data in the device-encrypted storage area with the private data in the credential-encrypted storage area.

The above embodiments involve the process of adding, updating and deleting the privacy data of the preset application in the device encrypted storage area under the direct boot mode. In order to understand the present disclosure more clearly, in the following closure, the operations of the corresponding preset application to process the private data in the credential encrypted storage area (also called the original operations) and the operations for processing the private data in the device encrypted storage area (which may be called new operations) will be illustrated. A simple understanding is to add corresponding new operations on the basis of the original operations of the preset application (such as adding, deleting, updating, etc.). Please note, the original operations and the new operations in the following disclosure are just simple examples, and more detailed steps can also be included.

Please refer to FIGS. 4a-4b. FIG. 4a is a flow chart of a preset application adding private data according to an embodiment of the present disclosure. FIG. 4b is a flow chart of a preset application updating private data according to an embodiment of the present disclosure.

Please refer to FIG. 4a, the process flow of adding the private data of the preset application includes following steps:

Step 411: receiving a data adding instruction of the preset application program and obtaining data to be added.

Step 412: adding the data to be added to the certificate encrypted storage area under the normal mode.

For example, if new contact information is added, the data to be added (contact information to be added) is added to the contact database in the credential encrypted storage area under the normal mode.

Step 413: obtaining the data identifier of the data to be added as the private data identifier.

Step 414: according to the data to be added, obtaining the private data to be used by the preset application in the direct boot mode of the mobile terminal. Here, all of the data to be added can be used as the private data. Or, a part of the data to be added can be used as the private data.

Step 415: backing up the private data identifier and private data to the device encrypted storage area in the direct boot mode.

Steps 411-412 correspond to the original operations of the preset application program, and steps 413-415 correspond to the new operations.

Please refer to FIG. 4b. The process flow of updating the private data of the preset applications includes following steps:

Step 421: receiving a data update instruction from a preset application program, and obtaining data to be updated.

Step 422: according to the data to be updated, updating the data corresponding to the credential encrypted storage area in the normal mode.

Step 423: obtaining a data identifier of the data to be updated, and determining a private data identifier according to the acquired data identifier. For example, detecting whether the obtained data identifier is a private data identifier, etc.

Step 424: obtaining the corresponding private data in the encrypted storage area of the device in the direct boot mode through the private data identifier.

Step 425: according to the data to be updated, updating the corresponding private data stored in the device encrypted storage area.

Steps 421-422 correspond to the original operations of the preset application, and Steps 423-425 correspond to the new operations. For details of each step in the above-mentioned FIG. 4a-FIG. 4b process flow, please refer to the description of the corresponding steps above, and the illustrations are omitted here.

The process flow of the preset application also includes the process flow of deleting the private data of the preset application. The process flow of deleting the private data of the preset application program is consistent with the process flow of updating the private data of the preset application. It can be understood that in the process flow of deleting private data of the preset application, the data updating instruction in the step corresponding to the process flow of updating private data of the above preset application is correspondingly changed into a data deletion instruction, and the data to be updated is correspondingly changed to the data to be deleted, the updating operation is correspondingly changed to the deleting operation, etc., Those details are omitted for simplicity.

In order to further understand the present disclosure, in the following disclosure, the emergency contact application will be used as an example to illustrate the above process flow.

For the emergency contact application, mobile terminal users can add one or more contact information in the contact database into the emergency contact application. In this way, the users can quickly search and make a call in an emergency situation. The original implementation logic of the emergency contact application is to use SharedPreference in the device encrypted storage area to obtain the identification information of the storage contact, such as the URI of the contact. When running the emergency contact application, the URI is used to match and query the corresponding contact information in the contact database. However, the emergency contact application cannot work normally in the direct boot mode because the contact database cannot be queried in the direct boot mode.

The present disclosure can use at least two policies to solve the problem that the emergency contact application cannot work normally in the direct boot mode: 1. backing up the corresponding emergency contact information in the contact database from the credential encrypted storage area to the device encrypted storage area, so that the emergency contact application can obtain emergency contact information from the device encrypted storage area in the direct boot mode. 2. obtaining the privacy data that the emergency contact application needs to use in the direct boot mode from the credential encrypted storage area, such as the emergency contact's contact name and contact phone number, etc., and backing up the private data that the emergency contact application needs to in the direct boot mode into the device encrypted storage area, so that the emergency contact application can obtain the private data to be used from the device encrypted storage area in the direct boot mode. Here, the policy 2 is preferred. Because the number of emergency contacts is not very large and the privacy data that needs to be used in the direct boot mode is not much, SharedPreference can be used in the policy 2 to store the privacy data that needs to be used in the direct boot mode. In the following disclosure, the original operations and the new operations of the corresponding emergency contact application will be introduced in the operations of adding, updating and deleting emergency contact information.

Please refer to FIG. 5a and FIG. 5b. FIG. 5a is a flow chart of an emergency contact application adding emergency contacts according to an embodiment of the present disclosure. FIG. 5b is a flow chart of an emergency contact application updating emergency contacts according to an embodiment of the present disclosure.

Please refer to FIG. 5a. The process for the emergency contact application to add an emergency contact includes:

Step 511: When receiving the data addition instruction of the emergency contact application program, calling the contact database according to the data addition instruction to query and determine the emergency contact information through the contact database.

Step 512: Obtaining the identification information of the emergency contact and saving the identification information of the emergency contact in the device encrypted storage area in the direct boot mode. If the identification information of the emergency contact is stored in the device encrypted storage area using SharedPreference, the identification information can be the URI of the contact.

Step 513: Obtaining the private data corresponding to the emergency contact information to be used in the direct boot mode.

The private data to be used in the direct boot mode includes contact phone number, contact name, etc.

Step 514: Backing up the obtained private data to be used in the direct boot mode to the device encrypted storage area through the obtained identification information of the emergency contact. Specifically, since the identification information of the corresponding emergency contact has been stored in the device encrypted storage area, it is necessary to query the corresponding SharedPreference according to the identification information of the emergency contact. Understandably, this step could be querying the key value corresponding to the identification information of the emergency contact, and then saving the private data to the corresponding SharedPreference in the device encrypted storage area.

Steps 511-512 correspond to the original operations of the emergency contact application, and Steps 513-514 correspond to the new operations.

Please refer to FIG. 5*b*, the process flow for the emergency contact application to update emergency contacts includes:

Step 521: When receiving the data update instruction of the emergency contact application, calling the contact database, querying and determining the emergency contact information to be updated through the contact database, and obtaining the identification information of the emergency contact.

Step 522: Querying and updating the identification information stored in the device encrypted storage area in the direct boot mode through the identification information of the emergency contact.

Here, the mobile terminal could update the identification information stored in the corresponding SharedPreference in the device encrypted storage area. The identification information is the identification information saved according to the original operations.

Step 523: Updating the privacy data to be used that are stored in the device encrypted storage area in the direct boot mode by using the obtained identification information of the emergency contact. Specifically, updating the private data that needs to be used in the corresponding SharedPreference in the device encrypted storage area in the direct boot mode. The private data includes the contact name and phone number of the emergency contact.

Here, Steps 521-522 correspond to the original operations of the emergency contact application, and step 523 corresponds to the new operations.

The process flow of the emergency contact application also includes the process flow of deleting the emergency contact of the emergency contact application. The process flow of deleting an emergency contact in the emergency contact application is consistent with the process flow of updating the emergency contact in the emergency contact application. Understandably, in the process flow of deleting emergency contacts of the emergency contact application, the data update instruction in the step corresponding to the process flow of updating emergency contacts of the above emergency contact application is correspondingly changed into a data deletion instruction, the identification information to be updated is changed to the identification information to be deleted, the updating operation is changed to the deleting operation to be updated to delete, etc. Further illustrations will be omitted for simplicity.

The process flow for the emergency contact to query the emergency contact information includes: when the emergency contact application is running, for example, when the emergency contact list is displayed, detecting whether the mobile terminal is in the direct boot mode; if the mobile terminal is in the direct boot mode, reading the private data corresponding to the emergency contact information from the device encrypted storage area, for example, reading the private data corresponding to the emergency contact information from the corresponding SharedPreference in the device encrypted storage area. The private data includes contact name, contact phone number, etc. of the emergency contact. The process flow further includes: if the mobile terminal is in the normal mode, reading the corresponding private data of the emergency contact from the default storage location, specifically, reading the corresponding private data from the contact database in the credential encrypted storage area. In this way, the privacy data corresponding to the emergency contact can be read no matter in the direct boot mode or in the normal mode, so that the emergency contact application program can be normally run in both modes.

Besides, in order to further illustrate the present disclosure, the phone call application is taken as an example for illustration in the following disclosure.

The phone call application is the basic function of the mobile terminal. It is the basis for emergency calls, and it is allowed to run in the direct boot mode. However, in the direct boot mode, the contact database in the credential encrypted storage area cannot be read. Therefore, the contact matching operation cannot be performed. That is, in the direct boot mode, the call interface can only display the phone number without knowing who is connecting, which introduces a bug/error in the phone call application under the direct boot mode.

The present disclosure can use at least two policies to solve the problem of the phone call application in the direct boot mode: 1. backing up all contact information/new contact information in the contact database to the device encrypted storage area in the direct boot mode, so that the phone call application can obtain each contact information from the device encrypted storage area in the direct boot mode; 2. obtaining the privacy data that the phone call application needs to use in the direct boot mode, such as the contact name and the contact phone number, etc., and backing up the privacy data that the phone call application needs to use in the direct boot mode to the device encrypted storage area, so that the phone call application could display information such as the contact name and the contact phone number when the phone call application makes a call in the direct boot mode. Preferably, the policy 2 is used. Specifically, SharedPreference is used to store the privacy data that the phone call application needs to use in the direct boot mode. Here, the original operations and the new operations of the corresponding phone call application will be introduced when it adds, updates, and deletes contact information.

Figures 6A, 6B:
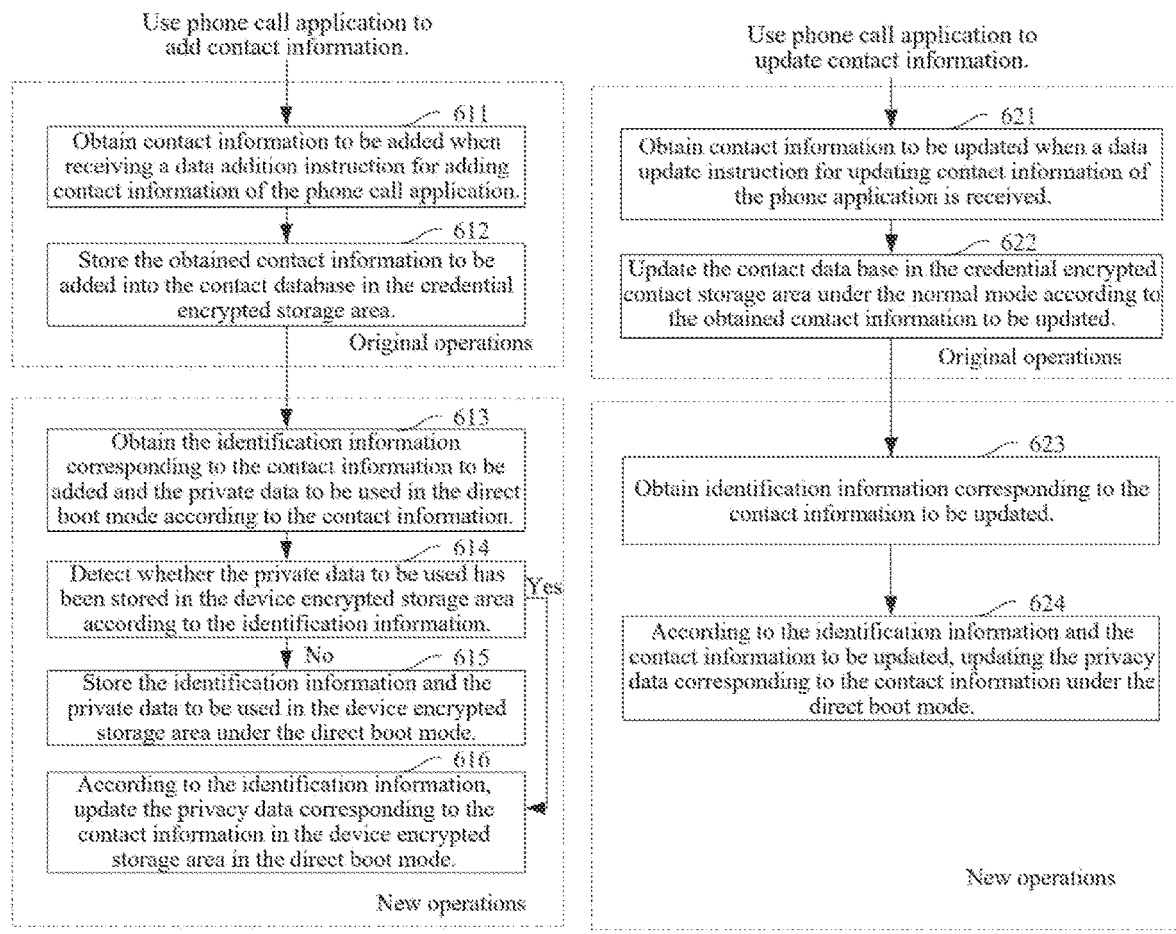
FIG. 6a is a flow chart of a phone call application adding contacts according to an embodiment of the present disclosure.
FIG. 6b is a flow chart of a phone call application updating contacts according to an embodiment of the present disclosure.
Figure 6C:
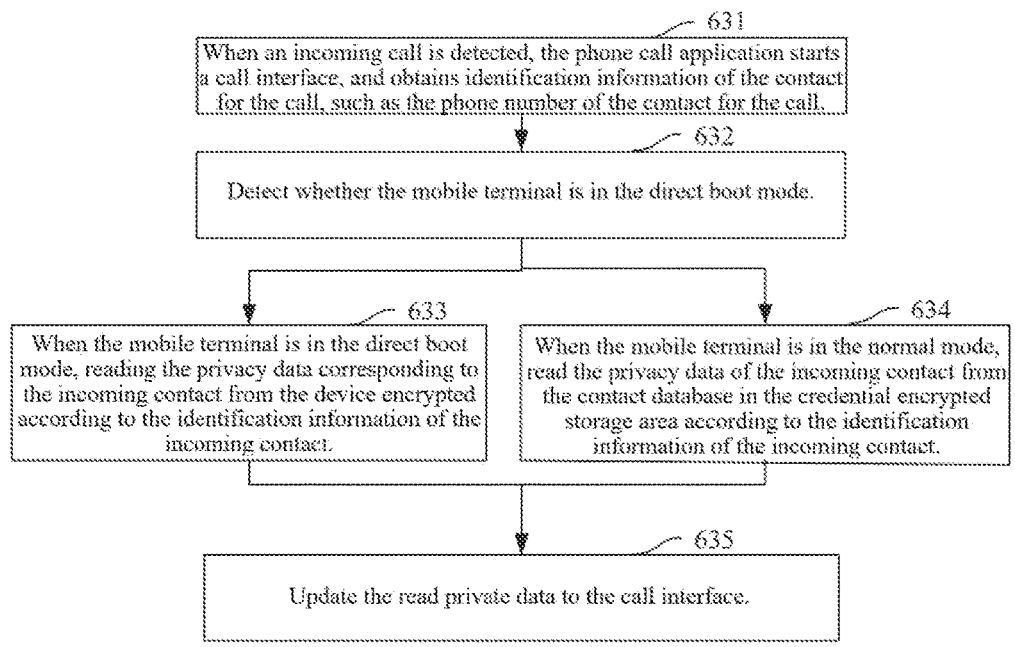
FIG. 6c is a flow chart of a phone call application querying contacts according to an embodiment of the present disclosure.

Please refer to FIGS. 6*a*-6*c*. FIG. 6*a* is a flow chart of a phone call application adding contacts according to an embodiment of the present disclosure. FIG. 6*b* is a flow chart of a phone call application updating contacts according to an embodiment of the present disclosure. FIG. 6*c* is a flow chart of a phone call application querying contacts according to an embodiment of the present disclosure.

Please refer to FIG. 6*a*, the process flow for the phone call application to add contact information includes:

Step 611: obtaining contact information to be added when receiving a data addition instruction for adding contact information of the phone call application. Here, the contact information to be added is obtained according to the data adding instruction.

Step 612: storing the obtained contact information to be added into the contact database in the credential encrypted storage area.

Step 613: obtaining the identification information corresponding to the contact information to be added and the private data to be used in the direct boot mode according to the contact information. Here, the private data to be used in the direct boot mode includes contact name, contact phone number and the like.

Step 614: detecting whether the private data to be used has been stored in the device encrypted storage area according to the identification information. If not, then go to Step 615; If yes, go to Step 616.

Step 615: Store the identification information and the private data to be used in the device encrypted storage area under the direct boot mode. For example, SharedPreference could be used to store those to the device encrypted storage area under the direct boot mode.

Step 616: according to the identification information, updating the privacy data corresponding to the contact information in the device encrypted storage area in the direct boot mode. Specifically, the device encrypted storage area in the update direct boot mode corresponds to the private data corresponding to the contact information in the SharedPreference.

Here, Steps 611-612 correspond to original operations of the phone call application, and Steps 613-616 correspond to new operations.

Please refer to FIG. 6b. The process of for the phone call application to update contact information includes:

Step 621: obtaining contact information to be updated when a data update instruction for updating contact information of the phone application is received.

Step 622: updating the contact data base in the credential encrypted contact storage area under the normal mode according to the obtained contact information to be updated.

Step 623: obtaining identification information corresponding to the contact information to be updated.

Step 624: according to the identification information and the contact information to be updated, updating the privacy data corresponding to the contact information under the direct boot mode.

Here, Steps 621-622 correspond to original operations of the phone call application, and Steps 623-624 correspond to new operations.

The process flow of the phone call application also includes the process flow of deleting the contact information of the phone call application. The process flow of deleting contact information of the phone call application is consistent with the process flow of updating contact information of the phone call application. Understandably, in the process flow of deleting contact information of the phone call application, the data update instruction in the step corresponding to the process flow of updating contact information of the phone call application is correspondingly changed into a data deletion instruction, the updating operation is changed to the deleting operation to be updated to delete, etc. Further illustrations will be omitted for simplicity.

Please refer to FIG. 6c, the process flow for the phone call application to query contact information includes:

Step 631: When an incoming call is detected, the phone call application starts a call interface, and obtains identification information of the contact for the call, such as the phone number of the contact for the call.

Step 632: Detecting whether the mobile terminal is in the direct boot mode.

Step 633: When the mobile terminal is in the direct boot mode, reading the privacy data corresponding to the incoming contact from the device encrypted according to the identification information of the incoming contact.

Specifically, the privacy data corresponding to the incoming contact is read from the corresponding SharedPreference in the device encrypted storage area. Here, the privacy data of the incoming call contact stored in the device encrypted storage area the contact name, contact phone number and other information that needs to be used in the direct boot mode. Then go to Step 635.

Step 634: When the mobile terminal is in the normal mode, reading the privacy data of the incoming contact from the contact database in the credential encrypted storage area according to the identification information of the incoming contact. Then go to Step 635.

Step 635: Updating the read private data to the call interface.

According to the method described in the above embodiment, this embodiment will be further described from the perspective of a data reading device. The data reading device can be implemented as an independent entity or can be integrated in a mobile terminal. The mobile terminal can include a smart phone, a pad, a wearable device, a robot and any other terminal device. The mobile terminal includes a preset application, which can be run in the boot mode (Direct Boot Mode) of the mobile terminal. It should be noted that the preset application could be run in the direct boot mode as well as in the normal mode. Preferably, the mobile terminal is a mobile terminal installed with an Android system.

Figure 7:
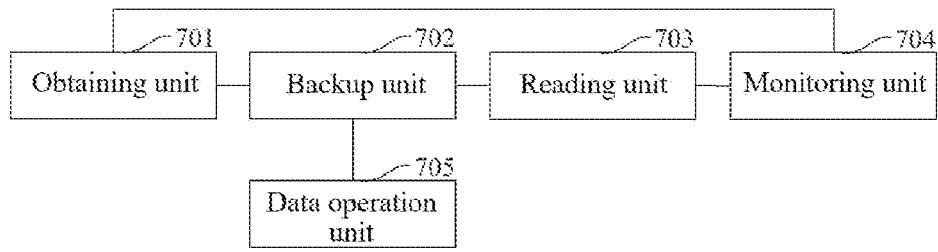
FIG. 7 is a diagram of a data reading device according to an embodiment of the present disclosure.

Please refer to FIG. 7. FIG. 7 is a diagram of a data reading device according to an embodiment of the present disclosure. The data reading device is used in the mobile terminal. The data reading device comprises an obtaining unit 701, a backup unit 702 and a reading unit 703.

The obtaining unit 701 is configured to obtain private data of the preset application.

The obtaining unit 701 is configured to obtain the privacy data of the preset application from the credential encrypted storage area under the normal mode of the mobile terminal. Or, if the data addition instruction of the preset application is received, the private data to be added by the preset application program is obtained according to the data addition instruction.

Further, the obtaining unit 701 is configured to obtain the private data of the preset application and the private data identifier corresponding to the private data from the credential encrypted storage area under the normal mode of the mobile terminal. Or, if the data addition instruction of the preset application is received, according to the data addition instruction, the privacy data to be added by the preset application and the privacy data identifier corresponding to the privacy data are obtained.

In an embodiment, the obtaining unit 701 is configured to obtain the private data to be used by the preset application program in the direct boot mode of the mobile terminal and the private data identifier corresponding to the private data.

The obtaining unit 701 is configured to obtain the private data to be used by the preset application in the direct boot mode of the mobile terminal from the credential encrypted storage area under the normal mode of the mobile terminal. Or, if the data addition instruction of the preset application is received, according to the data addition instruction, the private data to be added by the preset application to be used in the direct boot mode of the mobile terminal is obtained.

The backup unit 702 is configured to backup the private data to the device encrypted storage area under the direct boot mode of the mobile terminal.

If the obtaining unit 701 obtains the private data identifier, correspondingly, the backup unit 702 is configured to back up the private data and the corresponding private data identifier to the device encrypted storage area under the direct boot mode of the mobile terminal.

The reading unit 703 is configured to read the private data from the device encrypted storage area if the mobile terminal is in the direct boot mode when running the preset application. If the mobile terminal is in the direct boot mode, the private data are read from the device encrypted storage area under the direct boot mode.

The reading unit 703 is configured to detect whether the mobile terminal is in the direct boot mode when the preset application is being executed. If the mobile terminal is in the normal mode, the reading unit 703 reads the private data from the credential encrypted storage area under the normal mode. If the mobile terminal is in the direct boot mode, the reading unit 703 reads the private data from the device encrypted storage area under the direct boot mode.

In an embodiment, as shown in FIG. 7, the data reading device 703 may further include a monitoring unit 704. The monitoring unit 704 is configured to monitor the broadcast message of mode switching if the mobile terminal is in the direct boot mode. The mode switching means that the mode might be switched from the direct boot mode to the normal mode. Correspondingly, the reading unit 703 is further configured to re-read the private data from the credential encrypted storage area under the normal mode according to the private data identifier if the broadcast message of mode switching is monitored.

In an embodiment, as shown in FIG. 7, the data reading device may further include a data operation unit 705. The data operation unit 705 is used to determine the type of operation, the data to be operated and the data identification corresponding to the data to be operated according to the data operation instruction if a data operation instruction of the credential encrypted storage area of the mobile terminal is received. The data operation unit 705 detects whether the data identifier includes a private data identifier. If the private data identifier is included, the corresponding private data in the device encrypted storage area of the device are obtained according to the private data identifier. According to the type of operation and the data to be operated, a corresponding operation is performed on the private data in the device encrypted storage area.

The data operation unit 705 includes a data adding unit, a data updating unit, a data deleting unit, etc.

The data adding unit is configured to receive the data adding instruction of the preset application and obtain the data to be added; add data to be added to the credential encrypted storage area under the normal mode; obtain the data identifier of the data to be added as a private data identifier; according to the data to be added, obtain the privacy data to be used by the preset application in the direct boot mode of the mobile terminal; and back up the private data identification and private data to the device encrypted storage area of the device under the direct boot mode.

The data update unit is configured to receive a data update instruction from a preset application and obtain acquire data to be updated; according to the data to be updated, update the data corresponding to the credential encrypted storage area under the normal mode; obtain the data identification of the data to be updated, and determine the privacy data identification according to the obtained data identification; obtain the corresponding private data in the device encrypted storage under the direct boot mode through the private data identification; and according to the data to be updated, update the corresponding private data in device encrypted storage area.

The data deletion unit is configured to receive a data deletion instruction from a preset application program and obtain data to be deleted; according to the data to be deleted, delete the data corresponding to the credential encrypted storage area under the normal mode; obtain the data identification of the data to be deleted and determine the privacy data identification according to the obtained data identification; obtain the corresponding privacy data in the device encrypted storage area of the device under the direct boot mode through the privacy data identification; delete the corresponding private data in the device encrypted storage area.

Each of the above-mentioned modules and/or units could be independently implemented or implemented as a whole entity or more entities based on different combinations. The actual implementation of each of the above-mentioned modules and/or units could be referred to the above-mentioned embodiments and thus further illustrations are omitted here.

Figure 8:
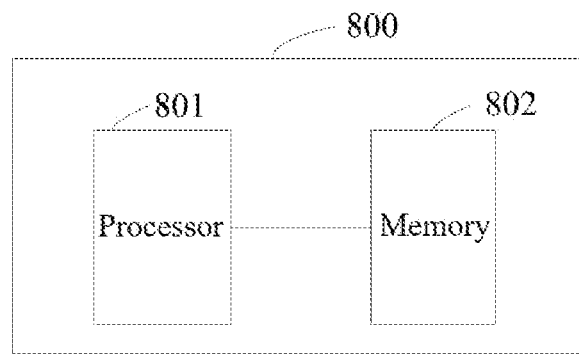
FIG. 8 is a diagram of a mobile terminal according to an embodiment of the present disclosure.

In addition, the present disclosure further provides a mobile terminal. Please refer to FIG. 8. FIG. 8 is a diagram of a mobile terminal according to an embodiment of the present disclosure. The mobile terminal can be a smart phone, a tablet, a robot, or any other device including at least one sensor. The mobile terminal 800 includes a processor 801 and a storage device 802. The processor 801 is electrically connected to the storage device 802. The storage device 802 is configured to store a plurality of instructions and data.

In this embodiment, the processor 801 loads the instructions and data corresponding to the process of one or more applications into the storage device 802 and execute the applications in the storage device 802 in order to perform one or more steps of any one of the above-mentioned data reading methods described in the above embodiments.

The mobile terminal can implement the steps of the data reading method provided in any embodiments of the present disclosure, and therefore, can realize the beneficial effects that can be achieved by any data reading method provided in the embodiments of the present disclosure. For details, the foregoing embodiments will not be repeated here.

Figure 9:
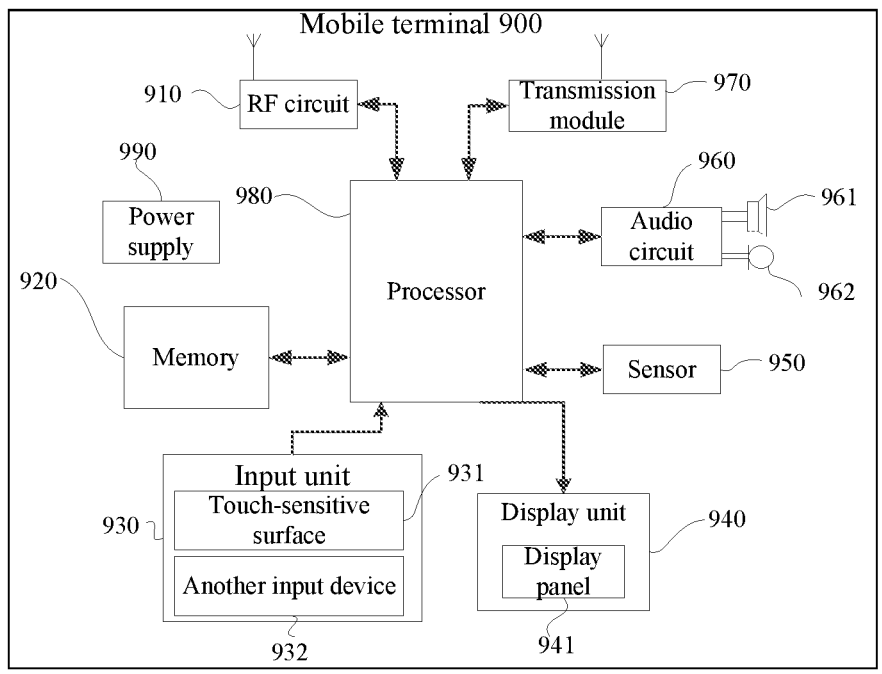
FIG. 9 is a diagram of a mobile terminal according to another embodiment of the present disclosure.

Please refer to FIG. 9. FIG. 9 is a functional block diagram of a mobile terminal according to another embodiment of the present disclosure. The mobile terminal 900 may be a mobile phone, a wearable device, a personal computer with a touch screen, a robot with a touch screen, and the like. The mobile terminal 900 includes a touch screen, which can be used to receive input numbers or character information. The mobile terminal 900 comprises a Radio Frequency (RF) circuit 910, a memory 920 comprising one or more (only one is shown in the figure) computer-readable storage medium, an input unit 930, a display unit 940, a sensor 950, an audio circuit 960, a speaker 961, a microphone 962, a transmission module 970, a processor 980 comprising one or more (only one is shown in the figure) processing core, a power supply 990, and other components. One having ordinary skills in the art could understand that the structure of the mobile terminal 900 shown in FIG. 6 is not a limitation of the present disclosure. The mobile terminal 900 could comprise more or less components, a combination of some components, or different component arrangements.

The RF circuit 910 may be configured to receive and send a signal during an information receiving and sending process or a conversation process. Specifically, after receiving downlink information from a base station, the RF circuit 910 delivers the downlink information to one or more processors 980 for processing, and sends related uplink data to the base station. Generally, the RF circuit 910 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 910 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VOIP), a Worldwide Interoperability for Microwave Access (Wi-Max), any other protocols for e-mail, instant communication and short message, and the like.

The memory 920 may be configured to store a software program and module. The processor 980 runs the software program and module stored in the memory 920, to implement various functional applications and data processing. The memory 920 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 920 may include a high speed random access memory, and may also include a non-volatile memory, such as at least one magnetic disk memory, a flash memory device, or another volatile solid-state memory. Correspondingly, the memory 920 may further include a memory controller, so that the processor 980 and the input unit 930 access the memory 920.

The input unit 930 may be configured to receive input digit or character information, and generate keyboard, mouse, joystick, optical, or track ball signal input related to the user setting and function control. Specifically, the input unit 930 may include a touch-sensitive surface 931 and other input device 932. The touch-sensitive surface 931 may also be referred to as a touch screen or a touch panel, and may collect a touch operation of a user on or near the touch-sensitive surface 931 (such as an operation of a user on or near the touch-sensitive surface by using any suitable object or attachment, such as a finger or a stylus), and drive a corresponding connection apparatus according to a preset program. Optionally, the touch-sensitive surface 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 980. Moreover, the touch controller can receive and execute a command sent from the processor 980. In addition, the touch-sensitive surface may be implemented by using various types, such as a resistive type, a capacitance type, an infrared type, and a surface sound wave type. In addition to the touch-sensitive surface 331, the input unit 930 may further include the another input device 932. Specifically, the another input device 932 may include, but is not limited to, one or more of a physical keyboard, a functional key (such as a volume control key or a switch key), a track ball, a mouse, and a joystick.

The display unit 940 may be configured to display information input by the user or information provided for the user, and various graphical user ports of the mobile terminal. The graphical user ports may be formed by a graph, a text, an icon, a video, and any combination thereof. The display unit 940 may include a display panel. Optionally, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 980, so as to determine a type of a touch event. Then, the processor 980 provides corresponding visual output on the display panel according to the type of the touch event. Although, in FIG. 8, the touch-sensitive surface and the display panel are used as two separate parts to implement input and output functions, in some embodiments, the touch-sensitive surface and the display panel may be integrated to implement the input and output functions.

The mobile terminal may further include at least one sensor 950, such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the mobile terminal are not further described herein.

The audio circuit 960, a speaker 961, and a microphone 962 may provide audio interfaces between the user and the mobile terminal. The audio circuit 960 may transmit, to the speaker 961, a received electric signal converted from received audio data. The speaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 sends the audio data to, for example, another terminal by using the RF circuit 910, or outputs the audio data to the memory 920 for further processing. The audio circuit 960 may further include an earplug jack, so as to provide communication between a peripheral earphone and the mobile terminal.

The mobile terminal may help, by using the transmission module 970 (e.g. Wi-Fi module), a user to receive and send an e-mail, browse a webpage, and access stream media, and the like, which provides wireless broadband Internet access for the user. Although FIG. 8 shows the transmission module 970, it may be understood that, the wireless communications unit is not a necessary component of the mobile terminal, and can be ignored according to demands without changing the scope of the essence of the present disclosure.

The processor 980 is a control center of the mobile terminal, and connects various parts of the terminal by using various interfaces and lines. By running or executing the software program and/or module stored in the memory 920, and invoking data stored in the memory 920, the processor 980 performs various functions and data processing of the mobile terminal, thereby performing overall monitoring on the mobile phone. Optionally, the processor 980 may include one or more processing cores. Preferably, the processor 980 may integrate an application processor and a modem. The application processor mainly processes an operating system, a user interface, an application program, and the like. The modem mainly processes wireless communication. It may be understood that, the foregoing modem may not be integrated into the processor 980.

The mobile terminal further includes the power supply 990 (such as a battery) for supplying power to the components. Preferably, the power supply may be logically connected to the processor 980 by using a power supply management system, thereby implementing functions, such as charging, discharging, and power consumption management, by using the power supply management system. The power supply 990 may further include any component, such as one or more direct current or alternate current power supplies, a re-charging system, a power supply fault detection circuit, a power supply converter or an inverter, and a power supply state indicator.

Although not shown, the mobile terminal 900 may further comprise a camera (such as, a front camera, a rear camera), a Bluetooth module, and the like, which will not be described in detail. The display unit 940 of the mobile terminal 900 is a touch screen display. The mobile terminal 900 also comprises the memory 920 and one or more programs, wherein the one or more programs are stored in the memory 920 and are configured to be executed by the one or more processors 380 to perform the operations of:

obtaining privacy data of a preset application; backing up the private data to a device encrypted storage area under a direct boot mode of the mobile terminal; and when the mobile terminal is in the direct boot mode during the preset application being performed, reading the private data from the device encrypted storage area.

Each of the above-mentioned modules could be independently implemented or implemented as a whole entity or more entities based on different combinations. The actual implementation of each of the above-mentioned modules could be referred to the above-mentioned embodiments and thus further illustrations are omitted here.

One having ordinary skills in the art could understand that one or more steps in the above-mentioned switching method could be implemented by instruction or by executing instructions to control related hardware. The instruction(s) could be stored in a computer readable storage medium and loaded and executed by a processor. For this, the present disclosure discloses a storage medium. The computer readable medium stores a plurality of instructions. The instructions are executed by a processor to perform one or more steps of any of the above-mentioned switching methods.

The storage medium comprises a read only memory (ROM), a random access memory (RAM), an optical disk or a hard disk.

The instructions stored in the storage medium could be executed to perform the steps of any of the above-mentioned switching methods. Thus, the instructions could be used to achieve the benefits of any of the above-mentioned methods. More details could be referred to the above-mentioned embodiments and further illustrations are omitted here.

Above are embodiments of the present disclosure directed to a data reading method, a storage medium and a mobile terminal. Specfic examples are used to illustrate the principle and implementation of the present disclosure. The description of the above embodiments is only used to help understand the method and core idea of the present disclosure; meanwhile, for those skilled in the art, according to the application Thoughts, specific implementation methods and application ranges all have changes. In summary, the content of this specification should not be construed as limiting the present disclosure.

What is claimed is:

1. A data reading method, applied to a mobile terminal, the data reading method comprising:
    obtaining privacy data of a preset application;
    backing up the private data to a device encrypted storage area under a direct boot mode of the mobile terminal; and
    when the mobile terminal is in the direct boot mode during the preset application being performed, reading the private data from the device encrypted storage area;
    wherein obtaining the privacy data of the preset application comprises:
    obtaining the privacy data to be used by the preset application under the direct boot mode of the mobile terminal;
    wherein obtaining the privacy data to be used by the preset application under the direct boot mode of the mobile terminal comprises:
    from the credential encrypted storage area under the normal mode of the mobile terminal, obtaining the privacy data to be used by the preset application program under the direct boot mode of the mobile terminal, or
    when a data addition instruction of the preset application program is received, according to the data addition instruction, obtaining the private data to be added by the preset application under the direct boot mode of the mobile terminal.

2. The data reading method of claim 1, further comprising:
    when the mobile terminal is in a normal mode, reading the private data from a credential encrypted storage area under the normal mode.

3. The data reading method of claim 1, further comprising:
    when the mobile terminal is in the direct boot mode, monitoring a broadcast message of mode switching, and switching the mobile terminal from the direct boot mode to the normal mode; and
    when the broadcast message of mode switching is monitored, reading the private data from the credential encrypted storage area under the normal mode.

4. The data reading method of claim 1, wherein the step of obtaining the privacy data of the preset application comprises: obtaining the private data and a private data identifier corresponding to the private data; and the step of backing up the private data to the device encrypted storage area under the direct boot mode of the mobile terminal comprises: backing up the private data and the private data identifier to the device encrypted storage area under the direct boot mode of the mobile terminal.

5. The data reading method of claim 4, further comprising following steps after backing up the private data and the private data identifier to the device encrypted storage area under the direct boot mode of the mobile terminal:
    when a data operation instruction of the credential encrypted storage area under the normal mode of the mobile terminal is received, determine an operation type, data to be operated, and a data identifier corresponding to the data to be operated according to the data operation instruction;
detecting whether the data identifier includes a private data identifier;
when the private data identifier is included, according to the private data identifier, obtaining the corresponding private data in the encrypted storage area of the device;
performing an operation on the private data according to the operation type and the data to be operated.

6. The data reading method of claim 5, wherein the data operation instruction is a data adding instruction and the operation type is addition, the data to be operated includes data to be added, and the corresponding data identifier includes a data identifier of the data to be added;
detecting whether the data identifier includes the private data identifier comprises: obtaining the data identifier of the data to be added, determining that the data identifier includes a private data identifier according to the data identifier, and using the data identifier as a private data identifier;
obtaining the corresponding private data in the device encrypted storage area according to the private data identifier comprises: obtaining the privacy data to be used by the preset application in the direct boot mode of the mobile terminal according to the privacy data identifier, and using the privacy data to be used in direct boot direct boot mode as the corresponding privacy data in the device encrypted storage area; and
performing the operation on the private data according to the operation type and the data to be operated comprises: backing up the private data identifier and the private data to the device encrypted storage area in the direct boot mode.

7. The data reading method of claim 5, wherein the data operation instruction is a data updating instruction and the operation type is update, the data to be operated includes data to be updated, and the corresponding data identifier includes a data identifier of the data to be updated;
detecting whether the data identifier includes the private data identifier comprises: obtaining the data identifier of the data to be updated, determining a private data identifier according to the data identifier; and
performing the operation on the private data according to the operation type and the data to be operated comprises: updating the corresponding private data in the device encrypted storage area in the direct boot mode according to the data to be updated.

8. The data reading method of claim 5, wherein the data operation instruction is a data deletion instruction and the operation type is deletion, the data to be operated includes data to be deleted, and the corresponding data identifier includes a data identifier of the data to be deleted;
detecting whether the data identifier includes the private data identifier comprises: obtaining the data identifier of the data to be deleted, determining a private data identifier according to the data identifier; and
performing the operation on the private data according to the operation type and the data to be operated comprises: deleting the corresponding private data in the device encrypted storage area in the direct boot mode according to the data to be deleted.

9. A non-transitory computer readable medium, storing a plurality of instructions, configured to be executed by a processor of a mobile terminal to perform operations comprising:

obtaining privacy data of a preset application;
backing up the private data to a device encrypted storage area under a direct boot mode of the mobile terminal; and
when the mobile terminal is in the direct boot mode during the preset application being performed, reading the private data from the device encrypted storage area;
wherein the operations further comprise:
when the mobile terminal is in the direct boot mode, monitoring a broadcast message of mode switching, and switching the mobile terminal from the direct boot mode to the normal mode; and
when the broadcast message of mode switching is monitored, reading the private data from the credential encrypted storage area under the normal mode.

10. The non-transitory computer readable medium of claim 9, wherein obtaining the privacy data of the preset application comprises: obtaining the private data and a private data identifier corresponding to the private data; and
backing up the private data to the device encrypted storage area under the direct boot mode of the mobile terminal comprises: backing up the private data and the private data identifier to the device encrypted storage area under the direct boot mode of the mobile terminal.

11. The non-transitory computer readable medium of claim 10, wherein the operations further comprise following operations after backing up the private data and the private data identifier to the device encrypted storage area under the direct boot mode of the mobile terminal:
when a data operation instruction of the credential encrypted storage area under the normal mode of the mobile terminal is received, determine an operation type, data to be operated, and a data identifier corresponding to the data to be operated according to the data operation instruction;
detecting whether the data identifier includes a private data identifier;
when the private data identifier is included, according to the private data identifier, obtaining the corresponding private data in the encrypted storage area of the device;
performing an operation on the private data according to the operation type and the data to be operated.

12. The non-transitory computer readable medium of claim 11, wherein the data operation instruction is a data adding instruction and the operation type is addition, the data to be operated includes data to be added, and the corresponding data identifier includes a data identifier of the data to be added;
detecting whether the data identifier includes the private data identifier comprises: obtaining the data identifier of the data to be added, determining that the data identifier includes a private data identifier according to the data identifier, and using the data identifier as a private data identifier;
obtaining the corresponding private data in the device encrypted storage area according to the private data identifier comprises: obtaining the privacy data to be used by the preset application in the direct boot mode of the mobile terminal according to the privacy data identifier, and using the privacy data to be used in direct boot direct boot mode as the corresponding privacy data in the device encrypted storage area; and
performing the operation on the private data according to the operation type and the data to be operated comprises: backing up the private data identifier and the private data to the device encrypted storage area in the direct boot mode.

13. A mobile terminal, comprising:
a storage device, configured to store a plurality of instructions and data; and
a processor, electrically connected to the storage device, configured to execute the plurality of instructions and load the data to perform operations comprising:
obtaining privacy data of a preset application;
backing up the private data to a device encrypted storage area under a direct boot mode of the mobile terminal; and
when the mobile terminal is in the direct boot mode during the preset application being performed, reading the private data from the device encrypted storage area;
wherein obtaining the privacy data of the preset application comprises: obtaining the private data and a private data identifier corresponding to the private data;
wherein backing up the private data to the device encrypted storage area under the direct boot mode of the mobile terminal comprises: backing up the private data and the private data identifier to the device encrypted storage area under the direct boot mode of the mobile terminal;
wherein the operations further comprises following operations after backing up the private data and the private data identifier to the device encrypted storage area under the direct boot mode of the mobile terminal:
when a data operation instruction of the credential encrypted storage area under the normal mode of the mobile terminal is received, determine an operation type, data to be operated, and a data identifier corresponding to the data to be operated according to the data operation instruction;
detecting whether the data identifier includes a private data identifier;
when the private data identifier is included, according to the private data identifier, obtaining the corresponding private data in the encrypted storage area of the device;
performing an operation on the private data according to the operation type and the data to be operated.

14. The mobile terminal of claim 13, wherein the operations further comprise:
when the mobile terminal is in the direct boot mode, monitoring a broadcast message of mode switching, and switching the mobile terminal from the direct boot mode to the normal mode; and
when the broadcast message of mode switching is monitored, reading the private data from the credential encrypted storage area under the normal mode.

15. The mobile terminal of claim 13, wherein the data operation instruction is a data adding instruction and the operation type is addition, the data to be operated includes data to be added, and the corresponding data identifier includes a data identifier of the data to be added;
the operation of detecting whether the data identifier includes the private data identifier comprises: obtaining the data identifier of the data to be added, determining that the data identifier includes a private data identifier according to the data identifier, and using the data identifier as a private data identifier;
obtaining the corresponding private data in the device encrypted storage area according to the private data identifier comprises: obtaining the privacy data to be used by the preset application in the direct boot mode of the mobile terminal according to the privacy data identifier, and using the privacy data to be used in direct boot direct boot mode as the corresponding privacy data in the device encrypted storage area; and
performing the operation on the private data according to the operation type and the data to be operated comprises: backing up the private data identifier and the private data to the device encrypted storage area in the direct boot mode.

* * * * *